(12) United States Patent
Koseoglu

(10) Patent No.: US 12,281,263 B2
(45) Date of Patent: Apr. 22, 2025

(54) PLASTIC PYROLYSIS OIL PRETREATMENT

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 447 days.

(21) Appl. No.: 17/668,487

(22) Filed: Feb. 10, 2022

(65) Prior Publication Data

US 2023/0250344 A1 Aug. 10, 2023

(51) Int. Cl.
*C10G 1/10* (2006.01)
*B01D 53/04* (2006.01)
(Continued)

(52) U.S. Cl.
CPC ........... *C10G 1/10* (2013.01); *B01D 53/0423* (2013.01); *B01D 53/08* (2013.01); *C10G 1/002* (2013.01);
(Continued)

(58) Field of Classification Search
CPC ............... C10G 25/08; C10G 1/002; C10G 2300/1003; C10G 2300/202;
(Continued)

(56) References Cited

U.S. PATENT DOCUMENTS

2016/0264874 A1 9/2016 Narayanaswamy et al.
2019/0270939 A1 9/2019 Javeed et al.
(Continued)

FOREIGN PATENT DOCUMENTS

WO WO 2021165178 A1 * 8/2021
WO 2021204817 A1 10/2021
(Continued)

OTHER PUBLICATIONS

Notification of Transmittal of the International Search Report and the Written Opinion of the International Searching Authority, or the Declaration dated Feb. 28, 2023 pertaining to International application No. PCT/US2022/049246 filed Nov. 8, 2022, 15 pages.

*Primary Examiner* — Thuan D Dang
(74) *Attorney, Agent, or Firm* — DINSMORE & SHOHL LLP

(57) ABSTRACT

Process for converting waste plastics to refining feedstock. The process includes conducting pyrolysis of a plastic feedstock comprising waste plastics to produce a liquid stream of plastic pyrolysis oil; directly feeding the liquid stream of plastic pyrolysis oil to an adsorption based purification process to generate a treated plastic pyrolysis oil stream; and collecting the treated plastic pyrolysis oil stream from the adsorption vessel for further processing into value added products as a feedstock for conventional refining processes. The adsorption based purification process includes contacting the liquid stream of plastic pyrolysis oil with one or more adsorbent materials in an adsorption vessel, the adsorbent materials with at least one of the one or more adsorbent materials being configured for adsorption of organic molecules having heteroatoms of each of sulfur, nitrogen, oxygen, and chlorine. Such system may be integrated with a conventional refinery.

16 Claims, 3 Drawing Sheets

(51) Int. Cl.
*B01D 53/08* (2006.01)
*C10G 1/00* (2006.01)

(52) U.S. Cl.
CPC .. *B01D 2253/102* (2013.01); *B01D 2253/306* (2013.01); *B01D 2253/308* (2013.01); *B01D 2253/311* (2013.01); *B01D 2253/34* (2013.01); *B01D 2257/70* (2013.01); *B01D 2259/40083* (2013.01); *C10G 2300/1003* (2013.01); *C10G 2300/202* (2013.01); *C10G 2300/205* (2013.01); *C10G 2300/308* (2013.01); *C10G 2400/04* (2013.01)

(58) Field of Classification Search
CPC ........ C10G 2300/205; C10G 2300/308; C10G 2400/04; C10G 25/12; C10G 25/003; C10G 25/05; B01D 53/0423; B01D 53/08; B01D 2253/102; B01D 2253/306; B01D 2253/308; B01D 2253/311; B01D 2253/34; B01D 2257/70; B01D 2259/40083; B01J 20/28004; B01J 20/28016; B01J 20/28019; B01J 20/28057; B01J 20/28069; B01J 20/28078; B01J 20/3408; B01J 20/3416; B01J 20/3483; B01J 2220/42; B01J 2220/56; B01J 2220/603; B01J 2220/606; B01J 20/08; B01J 20/103; B01J 20/12; B01J 20/165; B01J 20/18; B01J 20/20; B01J 20/28047; B01J 20/3433; B01J 20/3475; B01J 20/3491; C10B 53/07
See application file for complete search history.

(56) References Cited

U.S. PATENT DOCUMENTS

2022/0010213 A1* 1/2022 Sun .................. C10G 1/10
2023/0029587 A1 2/2023 Weiss et al.

FOREIGN PATENT DOCUMENTS

WO 2021239699 A1 12/2021
WO 2022011385 A1 1/2022

* cited by examiner

PLASTIC PYROLYSIS OIL PRETREATMENT

TECHNICAL FIELD

The present disclosure relates to processes for converting waste plastics to refining feedstock. In particular, certain embodiments of the disclosure relate to process for converting waste plastics to refining feedstock through removal or organic molecules with heteroatoms through a specialized adsorption based purification process.

BACKGROUND

Plastic is a synthetic or semisynthetic organic polymer composed of mainly carbon and hydrogen. Further, plastics tend to be durable, with a slow rate of degradation, therefore they stay in the environment for a long time and are not prone to rapid breakdown upon disposal. Pure plastics are generally insoluble in water and nontoxic. However, additives used in plastic preparation are toxic and may leach into the environment. Examples of toxic additives include phthalates. Other typical additives include fillers, colorant, plasticizers, stabilizers, anti-oxidants, flame retardants, ultraviolet (UV) light absorbers, antistatic agents, blowing agents, lubricants used during its preparation to change its composition and properties.

Plastics pyrolyze at high temperatures and polymers can be converted back to their original monomer as gas or liquid and can be recovered. However, the additives added to the plastic during production present challenges in effectively utilizing the recovered products prom pyrolysis. Upon pyrolysis, the additives end-up in the pyrolysis products.

SUMMARY

Accordingly, there is a clear and long-standing need to provide a solution to utilize the pyrolysis products generated from the pyrolysis of plastics. To utilize such pyrolysis products the residue left from the additives in the pyrolysis product must be removed.

In accordance with one or more embodiments of the present disclosure, a process for converting waste plastics to refining feedstock is disclosed. The process includes (a) conducting pyrolysis of a plastic feedstock comprising waste plastics to produce a liquid stream of plastic pyrolysis oil, an off-gas stream, and a solids stream; (b) directly feeding the liquid stream of plastic pyrolysis oil to an adsorption based purification process to generate a treated plastic pyrolysis oil stream comprising less than 10 ppmw nitrogen, less than 10 ppmw sulfur, less than 10 ppmw chlorine, and less than 10 ppmw oxygen; and (c) collecting the treated plastic pyrolysis oil stream from the adsorption vessel for further processing into value added products as a feedstock for conventional refining processes. The adsorption based purification process comprises: i) contacting the liquid stream of plastic pyrolysis oil with one or more adsorbent materials in an adsorption vessel, the adsorbent materials configured for adsorption of organic molecules comprising one or more atoms of sulfur, nitrogen, oxygen, or chlorine, wherein at least one of the one or more adsorbent materials are configured for adsorption of organic molecules comprising each of sulfur, nitrogen, oxygen, and chlorine; and ii) discharging the treated plastic pyrolysis oil stream from the adsorption vessel.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWINGS

The following detailed description of specific embodiments of the present disclosure can be best understood when read in conjunction with the following drawings in which.

Reference will now be made in greater detail to various embodiments, some embodiments of which are illustrated in the accompanying drawings. Whenever possible, the same reference numerals will be used throughout the drawings to refer to the same or similar units.

DETAILED DESCRIPTION

Embodiments of processes for converting waste plastics to refining feedstock in combination with the associates systems are provided in the present disclosure.

A process for converting waste plastics to refining feedstock includes conducting pyrolysis of a plastic feedstock comprising waste plastics to produce a liquid stream of plastic pyrolysis oil, an off-gas stream, and a solids stream, directly feeding the liquid stream of plastic pyrolysis oil to an adsorption based purification process to generate a treated plastic pyrolysis oil stream comprising less than 10 ppmw nitrogen, less than 10 ppmw sulfur, less than 10 ppmw chlorine, and less than 10 ppmw oxygen, and collecting the treated plastic pyrolysis oil stream from the adsorption vessel for further processing into value added products as a feedstock for conventional refining processes. The adsorption based purification process includes contacting the liquid stream of plastic pyrolysis oil with one or more adsorbent materials in an adsorption vessel and discharging the treated plastic pyrolysis oil stream from the adsorption vessel. The adsorbent material are configured for adsorption of organic molecules comprising one or more atoms of sulfur, nitrogen, oxygen, or chlorine. Further, at least one of the one or more adsorbent materials is configured for adsorption of organic molecules comprising each of sulfur, nitrogen, oxygen, and chlorine.

Having generally described the process for converting waste plastics to refining feedstock, embodiments of the same are described in further detail and with reference to the various Figures.

Figure 1:
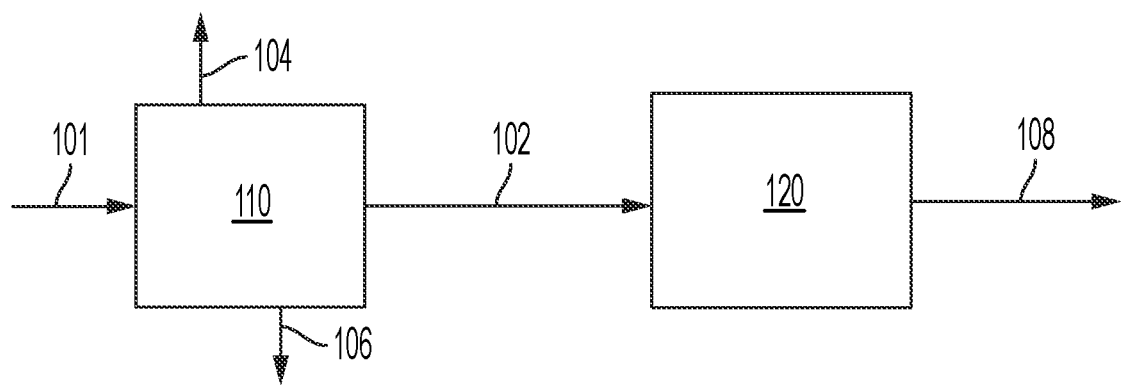
FIG. 1 is a schematic illustration of one or more embodiments of the present disclosure.

Referring first to FIG. 1, a schematic illustration of a one or more embodiments of the present disclosure in which waste plastics are converted to a feedstock for conventional refining processes is presented. An inlet stream 101 comprising mixed plastics is provided to a plastic pyrolysis unit 110. The plastic pyrolysis unit 110 is in fluid communication with the inlet stream 101 and is operable to generate a liquid stream of plastic pyrolysis oil 102, an off-gas stream 104, and a solids stream 106 from the inlet stream 101. The liquid stream of plastic pyrolysis oil 102 is directly fed to an adsorption based purification process 120. The adsorption based purification process 120 is in fluid communication with the plastic pyrolysis unit 110 and is operable to generate a treated plastic pyrolysis oil stream 108 comprising less than 10 parts per million by weight (ppmw) nitrogen, less than 10 ppmw sulfur, less than 10 ppmw chlorine, and less than 10 ppmw oxygen.

Plastic Feedstock

In one or more embodiments the inlet stream 101 comprises a plastic feedstock including mixed plastics of differing compositions. The plastic feedstock provided to the plastic pyrolysis unit 110 may be a mixture of plastics from various polymer families. In various embodiments, the plastic feedstock may comprise plastics representative of one or more of the polymer families disclosed in Table 1. Specifically, the plastic feedstock may comprise plastics representative of one or more of olefins, carbonates, aromatic polymers, sulfones, fluorinated hydrocarbon polymers, chlorinated hydrocarbon polymers, and acrylonitriles. Further, the plastic feedstock provided to the plastic pyrolysis unit 110 may be a mixture of high density polyethylene (HDPE, for example, a density of about 0.93 to 0.97 grams per cubic centimeter (g/cm$^3$), low density polyethylene (LDPE, for example, about 0.910 g/cm$^3$ to 0.940 g/cm$^3$), polypropylene (PP), linear low density polyethylene (LLDPE), polystyrene (PS), polyethylene terephthalate (PET). It will be appreciated that utilization of the mixed plastics feedstock allows for recycling of plastics without necessitating fine sorting of the plastics.

TABLE 1

Example Polymers

| Polymer family | Example polymer | Melting Point, °C. | Structure |
| --- | --- | --- | --- |
| Olefins | Polyethylene (PE) | 115-135 | |
| Olefins | Polypropylene (PP) | 115-135 | |
| carbonates | diphenylcarbonate | 83 | |
| aromatics | Polystyrene (PS) | 240 | |
| Sulfones | Polyether sulfone | 227-238 | |
| Fluorinated hydrocarbons | Polytetrafluoroethylene (PTFE) | 327 | |
| Chlorinated hydrocarbons | Polyvinyl chloride (PVC) | 100-260 | |

TABLE 1-continued

Example Polymers

| Polymer family | Example polymer | Melting Point, °C. | Structure |
|---|---|---|---|
| Acyrilnitriles | Polyacrylonitrile (PAN) | 300 | 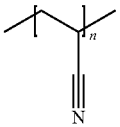 |

The plastics of the inlet stream 101 may be provided in a variety of different forms. The plastics may be in the form of a powder in smaller scale operations. The plastics may be in the form of pellets, such as those with a particle size of from 1 to 5 millimeter (mm) for larger scale operations. In further embodiments, the plastics may be provided as a chopped or ground product. Further, the plastics of the inlet stream 101 may be natural, synthetic or semi-synthetic polymers. In various embodiments, the plastics of the inlet stream 101 may comprise waste plastic, manufacturing off-spec product, new plastic products, unused plastic products, as well as their combinations.

Plastic Pyrolysis

The plastic pyrolysis unit 110 converts the inlet stream 101 of plastics to gaseous, liquid, and solid products products. The liquid products are provided as an effluent from the plastic pyrolysis unit 110 as the stream of plastic pyrolysis oil 102. The stream of gaseous products are generically shown in FIGS. 1 through 5 as off-gas stream 104. The gaseous products in the off-gas stream 104 may include various species such as hydrogen and hydrocarbon gases (C1-C4), carbon monoxide (CO), carbon dioxide ($CO_2$), and other acid gases. The stream of solids products are generically shown in FIGS. 1 through 5 as solids stream 106. The solids stream 106 may include pyrolysis residue generated from additives added to the mixed plastics of the inlet stream 101 during the initial manufacturing of the mixed plastics.

The specific reactor used as the plastic pyrolysis unit 110 can be of different types and are not limited for the purposes of the present disclosure. One skilled in the art will appreciate that typical reactor types that can be used to serve the function of the plastic pyrolysis unit 110 are tank reactors, rotary kilns, packed beds, bubbling and circulating fluidized bed and others. In one or more embodiments, the pyrolysis of the waste plastics in the inlet stream 101 is performed in the presence or absence of a catalyst at a temperature of 300 to 1000° C. In various further embodiments, the plastic pyrolysis unit 110 may operate at a low severity at a temperature less than or equal to 450° C., at a high severity at a temperature at a temperature greater than 450° C., at a temperature of 300 to 450° C., at a temperature of 450 to 1000° C., at a temperature of 450 to 750° C., at a temperature of 600 to 1000° C., or at a temperature of 750 to 1000° C. In various embodiments, the plastic pyrolysis unit 110 may operate at a pressure in the range of 1 to 100 bars, 1 to 50 bars, 1 to 25 bars, or 1 to 10 bars. Further, in various embodiments, the residence time of the waste plastic feedstock in the plastic pyrolysis unit 110 may be 1 to 3600 seconds, 60 to 1800 seconds, or 60 to 900 seconds.

Plastic Pyrolysis Oil

It will be appreciated that the composition of the liquid stream of plastic pyrolysis oil 102 may vary depending on the composition of the waste plastics utilized in the inlet stream 101. Specifically, as the additives added to plastics during manufacture end-up in the pyrolysis products upon pyrolysis of the waste plastic, the amount and specific selection of organic molecules comprising one or more atoms of sulfur, nitrogen, oxygen, or chlorine present in the liquid stream of plastic pyrolysis oil 102 may be affected by the composition of the inlet stream 101. As such, it will be appreciated that treatment processes for plastic pyrolysis oils with organic molecules comprising one or more atoms of sulfur, nitrogen, oxygen, or chlorine only present at low levels below thresholds in accordance with the present disclosure may not be transferable and expected to perform in the same manner as the processes of the present disclosure with such organic molecules present at a greater concentration in the liquid stream of plastic pyrolysis oil 102.

In one or more embodiments, the liquid stream of plastic pyrolysis oil 102 may comprise up to 2000 ppmw of sulfur. In various further embodiments, the liquid stream of plastic pyrolysis oil 102 may comprise up to 1800 ppmw sulfur, up to 1600 ppmw sulfur, up to 1400 ppmw sulfur, or up to 1200 ppmw sulfur. Further, in various embodiments, the concentration of sulfur in the liquid stream of plastic pyrolysis oil 102 may also have a lower bound of at least 3 ppmw sulfur, at least 5 ppmw sulfur, at least 10 ppmw sulfur, at least 20 ppmw sulfur, or at least 40 ppmw sulfur.

In one or more embodiments, the liquid stream of plastic pyrolysis oil 102 may comprise up to 5000 ppmw of nitrogen. In various further embodiments, the liquid stream of plastic pyrolysis oil 102 may comprise up to 4000 ppmw nitrogen, up to 3500 ppmw nitrogen, up to 3000 ppmw nitrogen, or up to 2500 ppmw nitrogen. Further, in various embodiments, the concentration of nitrogen in the liquid stream of plastic pyrolysis oil 102 may also have a lower bound of at least 3 ppmw nitrogen, at least 5 ppmw nitrogen, at least 10 ppmw nitrogen, at least 100 ppmw nitrogen, or at least 500 ppmw nitrogen.

In one or more embodiments, the liquid stream of plastic pyrolysis oil 102 may comprise up to 2000 ppmw of chlorine. In various further embodiments, the liquid stream of plastic pyrolysis oil 102 may comprise up to 1800 ppmw chlorine, up to 1500 ppmw chlorine, up to 1200 ppmw sulfur, or up to 1000 ppmw chlorine. Further, in various embodiments, the concentration of chlorine in the liquid stream of plastic pyrolysis oil 102 may also have a lower bound of at least 1 ppmw chlorine, at least 5 ppmw chlorine, at least 10 ppmw chlorine, at least 20 ppmw chlorine, or at least 40 ppmw chlorine.

In one or more embodiments, the liquid stream of plastic pyrolysis oil 102 may comprise up to 2000 ppmw of oxygen. In various further embodiments, the liquid stream of plastic pyrolysis oil 102 may comprise up to 1900 ppmw oxygen, up to 1800 ppmw oxygen, up to 1750 ppmw oxygen, or up to 1600 ppmw oxygen. Further, in various embodiments, the concentration of oxygen in the liquid stream of plastic pyrolysis oil 102 may also have a lower bound of at least 3 ppmw oxygen, at least 5 ppmw oxygen, at least 10 ppmw oxygen, at least 100 ppmw oxygen, or at least 500 ppmw oxygen.

For clarity, it is noted that the liquid stream of plastic pyrolysis oil 102 may comprise each of sulfur, nitrogen, oxygen, and chlorine at the previously disclosed concentrations as well as a subset of only one, two, or three of sulfur, nitrogen, oxygen, and chlorine at the previously disclosed concentrations.

Adsorption Based Purification Process

The adsorption based purification process 120 comprises contacting the liquid stream of plastic pyrolysis oil 102 with one or more adsorbent materials in an adsorption vessel. The adsorbent materials are configured for adsorption of organic molecules comprising one or more atoms of sulfur, nitrogen, oxygen, or chlorine. Further, at least one of the one or more adsorbent materials are configured for adsorption of organic molecules comprising each of sulfur, nitrogen, oxygen, and chlorine. That is, at least one of the adsorbent materials is configured for adsorption of sulfur containing compounds, at least one of the adsorbent materials is configured for adsorption of nitrogen containing compounds, at least one of the adsorbent materials is configured for adsorption of oxygen containing compounds, and at least one of the adsorbent materials is configured for adsorption of chlorine containing compounds. The adsorption of the organic molecules comprising each of sulfur, nitrogen, oxygen, and chlorine generates the treated plastic pyrolysis oil stream 108 which is discharged from the adsorption vessel for collection and further processing into value added products as a feedstock for conventional refining processes.

It is desirable to remove organic molecules comprising one or more atoms of sulfur, nitrogen, oxygen, or chlorine from the liquid stream of plastic pyrolysis oil 102 before feeding the resulting treated plastic pyrolysis oil stream 108 to conventional refining processes for production of value added products as such organic molecules may impede or affect the chemical reactions occurring in the conventional refining processes. Value added products such as ethylene, propylene, and butylenes may be produced from pyrolysis oils and other hydrocarbon streams using conventional refining processes such as hydrotreating, hydrocracking, or fluid catalytic cracking, but residual organic molecules comprising heteroatoms in the liquid stream of plastic pyrolysis oil 102 may affect the conventional refining processes and the yield of such value added products. As such, removal of molecules comprising one or more atoms of sulfur, nitrogen, oxygen, or chlorine from the liquid stream of plastic pyrolysis oil 102 before feeding the resulting treated plastic pyrolysis oil stream 108 to conventional refining processes is imperative when converting waste plastics to refining feedstock. It is explicitly noted that the presence of chlorine in process steams provided to conventional refining processes is especially problematic.

Adsorption is a separation technology which may be utilized to purify liquid or gaseous streams. When a solid is placed in contact with a gaseous or liquid compound, forces are exerted between the surface of the solid and the gaseous or liquid compound causing bonds to be formed. This is the phenomenon called adsorption. The bonds may have varying strength depending on the nature of the compounds and of the solid involved. The differing bond strengths may result in selective adsorption of only certain components in mixtures. It is noted that steric hindrance or kinetic phenomena may also contribute to the selectivity of the adsorption phenomena. It is understood that a number of microporous solids with a large specific area, and consequently with a large adsorption capacity, can be used as adsorbent materials in an adsorption vessel to take advantage of this highly specific adsorption selectivity in order to fractionate mixtures or selectively remove undesirable components from such mixtures.

Having generally described the adsorption based purification process 120 and separation by adsorption, embodiments of specific arrangements and configurations of the adsorption based purification process 120 will be provided with reference to the various Figures.

Single Adsorption Vessel

Figure 2:
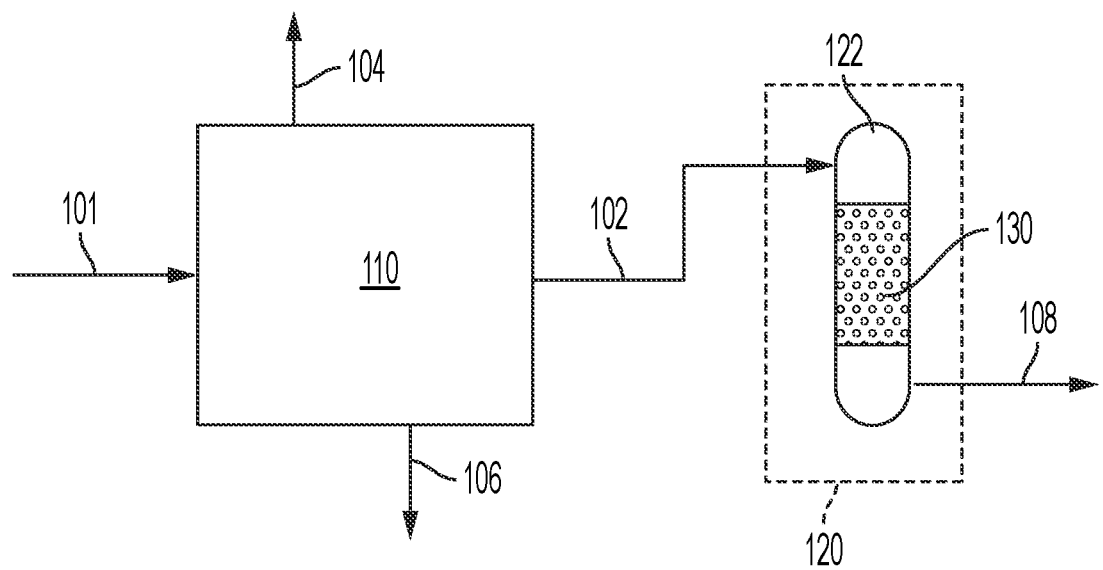
FIG. 2 is a schematic illustration of one or more embodiments of the present disclosure, in which a single adsorption vessel is utilized.

With reference to FIG. 2, in one or more embodiments, the adsorption based purification process 120 includes a single adsorption vessel 122. The liquid stream of plastic pyrolysis oil 102 is fed directly into the adsorption vessel 122 and contacted with the adsorbent materials 130 disposed therein to generate the treated plastic pyrolysis oil stream 108. In such configuration, the adsorbent materials 130 disposed in the single adsorption vessel 122 collectively are configured for adsorption of sulfur containing compounds, nitrogen containing compounds, oxygen containing compounds, and chlorine containing compounds. As such, it will be appreciated that in one or more embodiments, a single adsorbent material 130 is provided capable of adsorption of sulfur containing compounds, nitrogen containing compounds, oxygen containing compounds, and chlorine containing compounds.

In one or more further embodiments, a plurality of different adsorbent materials 130 are provided to achieve adsorption of sulfur containing compounds, nitrogen containing compounds, oxygen containing compounds, and chlorine containing compounds with each adsorbent material 130 adsorbing one or more of the sulfur containing compounds, nitrogen containing compounds, oxygen containing compounds, and chlorine containing compounds. The plurality of different adsorbent materials 130 may be provided in a homogeneous or heterogeneous manner.

Specifically, in one or more embodiments, the plurality of different adsorbent materials 130 are mixed together into a single amalgamation of adsorbent materials 130 and in one or more further embodiments, the plurality of different adsorbent materials 130 are provided as distinct layers or groupings within the adsorption vessel 122.

Multiple Adsorption Vessels in Series

Figure 3:
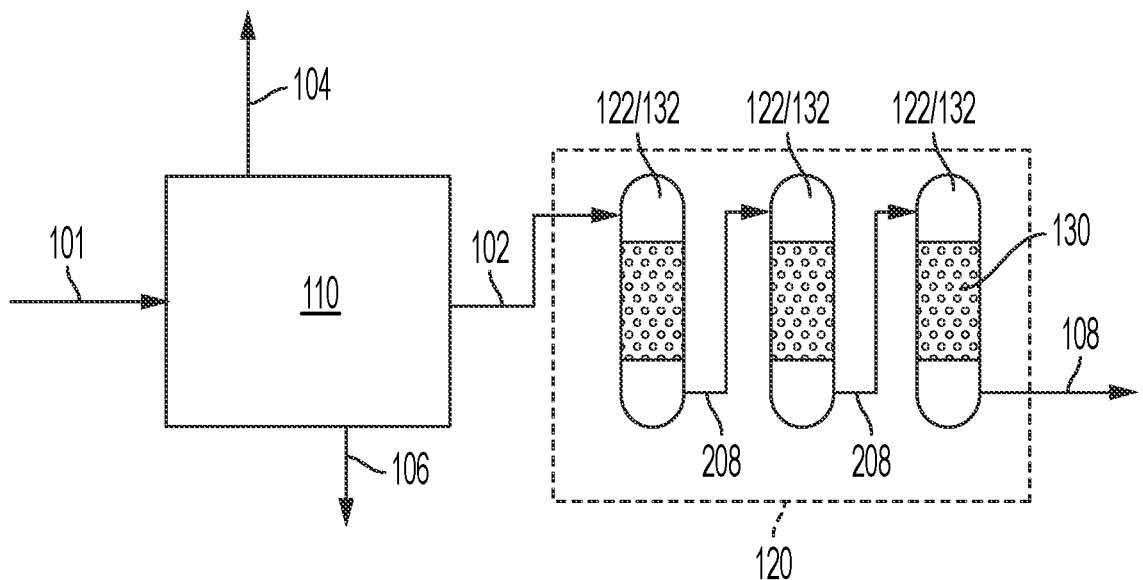
FIG. 3 is a schematic illustration of one or more embodiments of the present disclosure, in which a serial adsorption vessels are utilized.

With reference to FIG. 3, in one or more embodiments, the adsorption based purification process 120 includes multiple adsorption vessel 122 in series which may be alternatively referenced as serial adsorption vessels 132. For clarity, disclosure with reference to the adsorption vessel 122 is fully transferable to the serial adsorption vessels 132 as well. The liquid stream of plastic pyrolysis oil 102 is fed directly into the first of the serial adsorption vessels 132 and contacted with the adsorbent materials 130 disposed therein to generate an intermediary treated plastic pyrolysis oil stream 208. The intermediary treated plastic pyrolysis oil stream 208 is then passed to further serial adsorption vessels 132 in a sequential manner to further process the intermediary treated plastic pyrolysis oil stream 208. The final serial adsorption vessel 132 of the series of adsorption vessels 122 discharges the treated pyrolysis oil stream 108. In such configuration, the adsorbent materials 130 disposed in the serial adsorption vessels 132 collectively are configured for adsorption of sulfur containing compounds, nitrogen containing compounds, oxygen containing compounds, and chlorine containing compounds.

As such, it will be appreciated that in one or more embodiments, a single adsorbent material 130 is provided in each of the serial adsorption vessels 132, each adsorbent material 130 capable of adsorption of one or more of sulfur containing compounds, nitrogen containing compounds, oxygen containing compounds, and chlorine containing compounds. For example, the adsorbent material 130 provided in the first serial adsorption vessel 132 may be selective toward adsorption of sulfur containing compounds, the adsorbent material 130 provided in the second serial adsorption vessel 132 provided may be selective toward adsorption of nitrogen containing compounds, the adsorbent material 130 provided in the third serial adsorption vessel 132 may be selective toward adsorption of oxygen containing compounds, and the adsorbent material 130 provided in the fourth serial adsorption vessel 132 may be selective toward adsorption of chlorine containing compounds. It will be appreciated that a single adsorbent material 130 selective toward more than one of sulfur containing compounds, nitrogen containing compounds, oxygen containing compounds, and chlorine containing compounds may be provided in a single one of the serial adsorption vessels 132, thereby reducing the total minimum number of serial adsorption vessels 132 necessary to achieve adsorption of sulfur containing compounds, nitrogen containing compounds, oxygen containing compounds, and chlorine containing compounds.

In one or more embodiments, blends of multiple adsorbent materials 130 may be provided in each serial adsorption vessel 132 to achieve the desired adsorption characteristics of the sulfur containing compounds, nitrogen containing compounds, oxygen containing compounds, and chlorine containing compounds. For example, the adsorption materials 130 provided in the first serial adsorption vessel 132 may be a blend selective to each of the sulfur containing compounds, nitrogen containing compounds, oxygen containing compounds, and chlorine containing compounds while the blends provided in further serial adsorption vessels 132 provided in the series are directed to focused adsorption of only a single one of the sulfur containing compounds, nitrogen containing compounds, oxygen containing compounds, and chlorine containing compounds. Further, as described with regards to embodiments with a single adsorption vessel 122, the blends of multiple adsorbent materials 130 may be provided in both a homogenous as well as a heterogeneous manner within each serial adsorption vessel 132.

In various embodiments where the adsorption based purification process 120 includes multiple adsorption vessels 122 provided in series, the total number of serial adsorption vessels 132 may be 2 serial adsorption vessels 132, 3 serial adsorption vessels 132, 4 serial adsorption vessels 132, 5 serial adsorption vessels 132, up to 8 serial adsorption vessels 132, up to 12 serial adsorption vessels 132, or 2 to 12 serial adsorption vessels 132. An arrangement with 3 serial adsorption vessels 132 is illustrated in FIG. 3, but is may be easily understood that FIG. 3 could be reduced to 2 serial adsorption vessels 132 or expanded to include 12 serial adsorption vessels 132. It will be appreciated that a greater number of serial adsorption vessels 132 allows for increased specificity in selection of the adsorbent materials 130 placed in each serial adsorption vessel 132 at the detriment of increased operating and capital costs.

Multiple Adsorption Vessels in Parallel

Figure 4:
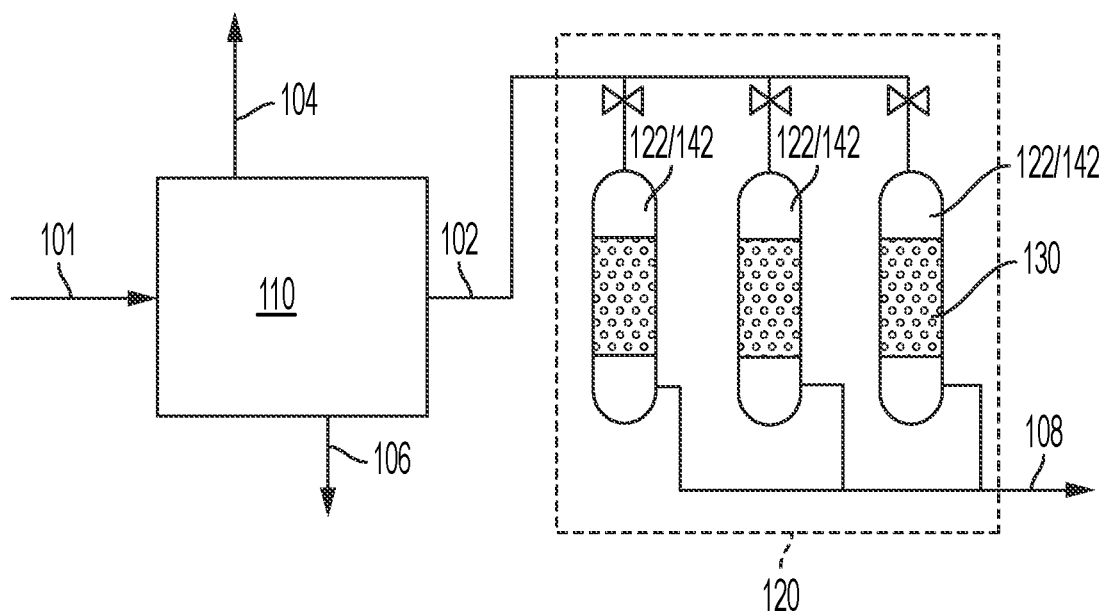
FIG. 4 is a schematic illustration of one or more embodiments of the present disclosure, in which parallel adsorption vessels are utilized.

With reference to FIG. 4, in one or more embodiments, the adsorption based purification process 120 includes multiple adsorption vessel 122 in parallel which may be alternatively referenced as parallel adsorption vessels 142. For clarity, disclosure with reference to the adsorption vessel 122 is fully transferable to the parallel adsorption vessels 142 as well. The liquid stream of plastic pyrolysis oil 102 is in direct fluid communication with two or more parallel adsorption vessels 142 and the liquid stream of plastic pyrolysis oil 102 is contacted with the adsorbent materials 130 disposed therein to generate the treated plastic pyrolysis oil stream 108. In such configuration, the adsorbent materials 130 collectively disposed in each of the parallel adsorption vessel 142 are configured for adsorption of sulfur containing compounds, nitrogen containing compounds, oxygen containing compounds, and chlorine containing compounds. As such, it will be appreciated that in one or more embodiments, a single adsorbent material 130 is provided capable of adsorption of sulfur containing compounds, nitrogen containing compounds, oxygen containing compounds, and chlorine containing compounds in each of the parallel adsorption vessels 142.

In one or more further embodiments, a plurality of different adsorbent materials 130 are provided in each parallel adsorption vessel 142 to achieve adsorption of sulfur containing compounds, nitrogen containing compounds, oxygen containing compounds, and chlorine containing compounds with each adsorbent material 130 adsorbing one or more of the sulfur containing compounds, nitrogen containing compounds, oxygen containing compounds, and chlorine containing compounds. The plurality of different adsorbent materials 130 may be provided in a homogeneous or heterogeneous manner. Specifically, in one or more embodiments, the plurality of different adsorbent materials 130 are mixed together into a single amalgamation of adsorbent materials 130 and in one or more further embodiments, the plurality of different adsorbent materials 130 are provided as distinct layers or groupings within each of the parallel adsorption vessel 142.

Provision of the adsorption vessels 122 in a parallel configuration as the parallel adsorption vessels 142 provides operational flexibility to the adsorption based purification process 120. In one or more embodiments, each of the parallel adsorption vessels 142 comprise distinct formulations of the adsorbent material 130. Specifically, the parallel adsorption vessels 142 may each comprise a formulation of adsorbent material 130 which is specific to the composition of the liquid stream of plastic pyrolysis oil 102 generated by differing compositions of mixed plastics forming the inlet stream 101. Such arrangement allows for the liquid stream of plastic pyrolysis oil 102 to be provided to one of multiple parallel adsorption vessel 142 which has been optimized to more effectively remove certain components. Targeted optimization of removal of certain components from the liquid stream of plastic pyrolysis oil 102 allows for adaptation as the composition of the inlet stream 101 varies as well as allows optimization of the treated pyrolysis oil stream 108 to match the desired composition fed to the conventional refining processes for further processing.

Provision of the adsorption vessels 122 in a parallel configuration allows the parallel adsorption vessels 142 to be operated in an alternating manner such that at least one of the parallel adsorption vessels 142 may undergoing regeneration while at least one different parallel adsorption vessel 142 is operated for adsorption of the organic molecules comprising one or more atoms of sulfur, nitrogen, oxygen, or chlorine from the liquid stream of plastic pyrolysis oil 102.

Figure 5:
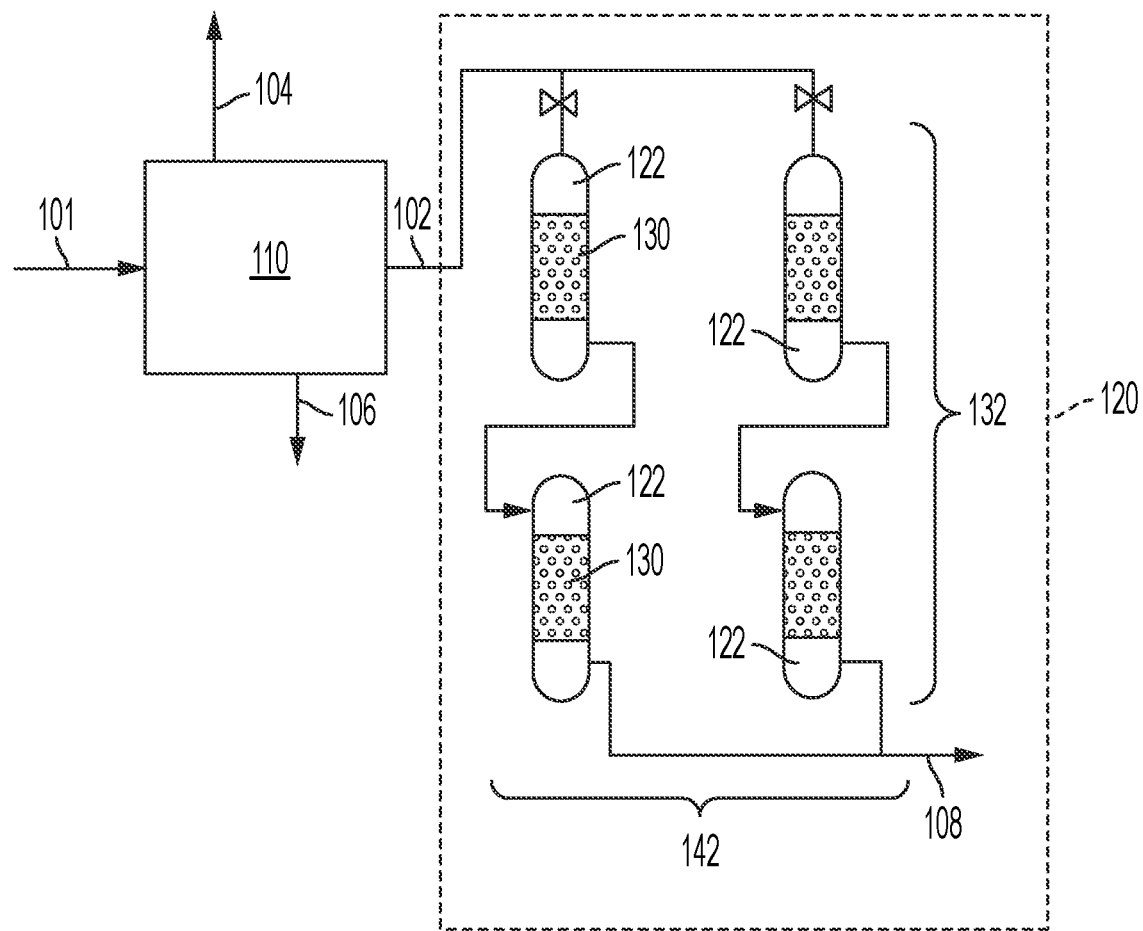
FIG. 5 is a schematic illustration of one or more embodiments of the present disclosure, in which parallel adsorption pathways of serial adsorption vessels are utilized.

With reference to FIG. 5, in one or more embodiments, a combination of adsorption vessels 122 provided in parallel and series are provided in the adsorption based purification process 120. Specifically, the adsorption based purification process 120 includes parallel adsorption pathways with each adsorption pathway formed of multiple adsorption vessels 122 in series. Such configuration provides the benefits of the multiple parallel adsorption vessels 142, such as allowing for operation in an alternating manner, while also providing the benefits of multiple serial adsorption vessels 132, such as tuning of each adsorption vessel 122 for adsorption of a specific type of component from the liquid stream of plastic pyrolysis oil 102.

In one or more embodiments, the adsorption vessels 122, and by extension the serial adsorption vessels 132 and parallel adsorption vessels 142, comprise a fixed-bed of the adsorbent material 130.

In one or more embodiments, the adsorption vessels 122, and by extension the serial adsorption vessels 132 and parallel adsorption vessels 142, comprise a slurry-bed of the adsorbent material 130.

In one or more embodiments, the adsorption vessels 122, and by extension the serial adsorption vessels 132 and parallel adsorption vessels 142, comprise a moving-bed of the adsorbent material 130.

Adsorbent Material

Adsorbent materials 130 may be selected to remove undesirable organic molecules from the liquid stream of plastic pyrolysis oil 102. In one or more embodiments, the adsorbent materials 130 provided in the adsorption vessels 122 are configured for adsorption of organic molecules comprising one or more atoms of sulfur, nitrogen, oxygen, or chlorine.

In various embodiments, the adsorbent material 130 comprises one or more of natural clays such as attapulgus clay, alumina, silica gel, activated carbon, and natural and synthetic zeolites such as ultrastable Y-type zeolites. It is noted that each type of adsorbent material 130 may provide enhanced removal of one or more of sulfur or nitrogen or chlorine or oxygen.

In one or more embodiments, the zeolite framework forming the adsorbent material 130 includes those identified by the International Zeolite Association, including those with the identifiers ABW, ACO, AEI, AEL, AEN, AET, AFG, AFI, AFN, AFO, AFR, AFS, AFT, AFV, AFX, AFY, AHT, ANA, ANO, APC, APD, AST, ASV, ATN, ATO, ATS, ATT, ATV, AVE, AVL, AWO, AWW, BCT, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETL, ETR, ETV, EUO, EWO, EWS, EZT, FAR, FAU, FER, FRA, GIS, GIU, GME, GON, GOO, HEU, IFO, IFR, -IFT, -IFU, IFW, IFY, IHW, IMF, IRN, IRR, -IRY, ISV, ITE, ITG, ITH, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, MRT, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POR, POS, PSI, PTO, PTT, PTY, PUN, PWN, PWO, PWW, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, SFW, SGT, SIV, SOD, SOF, SOR, SOS, SOV, SSF, SSY, STF, STI, STT, STW, -SVR, SVV, SWY, -SYT, SZR, TER, THO, TOL, TON, TSC, TUN, UEI, UFI, UOS, UOV, UOZ, USI, UTL, UWY, VET, VFI, VNI, VSV, WEI, -WEN, YFI, YUG, ZON, *BEA, *CTH, *-EWT, *-ITN, *MRE, *PCS, *SFV, *-SSO, *STO, *-SVY, *UOE. For example, certain known zeolites used in the petroleum refining industry include but are not limited to mordenite, ZSM-5, ZSM-11, ZSM-12, ZSM-22, ZSM-23, ZSM 35, beta-type (*BEA), Y, USY, and MCM zeolites such as MCM-41 and MCM-48. For example, these can be (FAU) framework, which includes USY, having a micropore size related to the 12-member ring when viewed along the [111] direction of 7.4×7.4 Å; (MFI) framework, which includes ZSM-5, having a micropore size related to the 10-member rings when viewed along the [100] and [010] directions of 5.5×5.1 Å and 5.6×5.3 Å, respectively; (MEL) framework, which includes ZSM-11, having a micropore size related to the 10-member ring when viewed along the [100] direction of 5.4×5.3 Å; (MTW) framework, which includes ZSM-12, having a micropore size related to the 12-member ring when viewed along the [010] direction of 5.6×6.0 Å; (TON) framework, which includes ZSM-12, having a micropore size related to the 10-member ring when viewed along the [001] direction of 4.6×5.7 Å; (MTT) framework, which includes ZSM-23, having a micropore size related to the 10-member ring when viewed along the [001] direction of 4.5×5.2 Å; (FER) framework, which includes ZSM-35, having a micropore size related to the 10-member ring and 8-member ring when viewed along the [001] and [010] directions of 4.2×5.4 Å and 3.5×4.8 Å, respectively; (MOR) framework, which includes mordenite zeolites, having a micropore size related to the 12-member ring and 8-member ring when viewed along the [001] and [001] directions of 6.5×7.0 Å and 2.6×5.7 Å, respectively; and (*BEA) framework, which includes zeolite beta polymorph A, having a micropore size related to the 12-member rings when viewed along the [100] and [001] directions of 6.6×6.7 Å and 5.6×5.6 Å, respectively. Zeolite-type materials are also known, such as crystalline silico-aluminophosphate (SAPO) or alumino-phosphate (AlPO) materials.

In one or more embodiments, the adsorbent material 130 comprises activated carbon. It will be appreciated that activated may be disposed of easily such as by burning in a power plant or being gasified without the need for solvent disposal or regeneration.

In one or more embodiments, the adsorbent material 130 comprises ultrastable Y-type zeolites. It will be appreciated that ultrastable Y-type zeolites are commonly used for other purposes in the refining industry and are thus readily accessible for utilization as the adsorbent material 130. Further, spent ultrastable Y-type zeolite catalyst from other catalytic conversion units within a refining operation can be used as the adsorbent material 130 after regeneration providing both an economic and environmental benefit through circular utilization within the refinery.

As embodiments of the adsorbent material 130 have been indicated as comprising alumina or silica, it is further noted, that the adsorbent material 130 may be fresh catalyst or spent catalyst formed from silica, alumina, or a combination of both silica and alumina in crystalline or amorphous states. The catalyst may additionally contain metals such as Co, Mo, Ni, or W.

In one or more embodiments, the adsorbent material 130 is provided as a pellet, sphere, or extrudate. In further, embodiments, the adsorbent material 130 is provided in a natural shape. For purposes of the present disclosure, a "natural shape" is the geometry formed from crushing or breaking up a larger unit of the adsorbent material 130. The adsorbent material 130, in various embodiments, may be a pellet, sphere, extrudate, or natural shape having a size in the range of 4 mesh to 60 mesh, 4 mesh to 50 mesh, 4 mesh to 40 mesh, or 4 mesh to 35 mesh As it has been determined that the rate of adsorption of adsorbent materials 130 such as activated carbon and zeolites depends inversely on particle size, such parameter is an important characteristic when analyzing performance and suitability of an adsorbent material 130 for a particular application.

In one or more embodiments, the adsorbent material 130 may include a binder to agglomerate the components of the adsorbent material 130 into a desired shape. It is noted that zeolites generally cannot be bound together so a binder component is used to form a pellet or other desired form. In various embodiments, the binder may be alumina or silica-alumina.

In one or more embodiments, the adsorbent material 130 comprises a surface area of at least 100 square meters per gram ($m^2/g$). In various further embodiments, the adsorbent material 130 comprises a surface area of at least 125 $m^2/g$, at least 200 $m^2/g$, at least 500 $m^2/g$, at least 1,000 $m^2/g$, or at least 2,000 $m^2/g$.

In one or more embodiments, the adsorbent material 130 comprises an average pore size of at least 10 angstrom (Å). In various further embodiments, the adsorbent material 130 comprises an average pore size of at least 25 Å, at least 50 Å, or at least 100 Å as well as less than 800 Å, less than 500 Å, less than 400 Å, or less than 200 Å. The average pore size is calculated according to the Barrett-Joyner-Halenda (BJH) method. In one or more embodiments, the adsorbent material 130 is mesoporous where macropores are greater than 500 Å in diameter, mesopores are 20 to 500 Å in diameter, and micropores are less than 20 Å in diameter.

In one or more embodiments, the adsorbent material 130 comprises a surface area of at least 100 square meters per gram ($m^2/g$). In various further embodiments, the adsorbent material 130 comprises a surface area of at least 125 $m^2/g$, at least 150 $m^2/g$, at least 200 $m^2/g$, or at least 250 $m^2/g$ with a maximum of 2,000 $m^2/g$, 1,800 $m^2/g$, 1,500 $m^2/g$, or 1,000 $m^2/g$.

In one or more embodiments the liquid stream of plastic pyrolysis oil 102 is contacted with the one or more adsorbent materials 130 in the adsorption vessel 122 at a temperature of 20 to 80° C. In various further embodiments, the liquid stream of plastic pyrolysis oil 102 is contacted with the one or more adsorbent materials 130 in the adsorption vessel 122 at a temperature of 20 to 80° C., 20 to 60° C., 20 to 50° C., or 20 to 40° C. It will be appreciated that operation at ambient conditions allows for operation without the need for external heating.

In one or more embodiments the liquid stream of plastic pyrolysis oil 102 is contacted with the one or more adsorbent materials 130 in the adsorption vessel 122 at a pressure of 1 to 10 bars. In various further embodiments, the liquid stream of plastic pyrolysis oil 102 is contacted with the one or more adsorbent materials 130 in the adsorption vessel 122 at a pressure of 1 to 8 bars, 1 to 6 bars, 1 to 4 bars, or 1 to 3 bars.

In one or more embodiments the liquid stream of plastic pyrolysis oil 102 is contacted with the one or more adsorbent materials 130 in the adsorption vessel 122 at a liquid hourly space velocity (LHSV) of 0.1 to 8 inverse hours ($h^{-1}$). In various further embodiments, the liquid stream of plastic pyrolysis oil 102 is contacted with the one or more adsorbent materials 130 in the adsorption vessel 122 at a LHSV of 0.1 to 5 $h^{-1}$, 0.1 to 4 $h^{-1}$, or 0.1 to 3 $h^{-1}$. It will be appreciated that the LHSV may be affected by the size of the adsorption vessel 122 with a smaller adsorption vessel 122 having a relatively higher LHSV than a comparatively larger adsorption vessel 122.

Adsorbent particles such as the adsorbent material 130 have finite capacity for fluid phase molecules. Extended contact with the liquid stream of plastic pyrolysis oil 102 will ultimately lead to the creation of a thermodynamic equilibrium between the solid phase of the adsorbent material 130 and the organic molecules desired for removal. At this equilibrium condition the rates of adsorption and desorption are equal and the net loading on the adsorbent material 130 cannot increase further making it necessary either to regenerate the adsorbent material 130 or to simply replace the adsorbent material. In one or more embodiments, the adsorbent material is discarded from the adsorption vessels 122, and by extension the adsorbent material 130 in the serial adsorption vessels 132 and parallel adsorption vessels 142. Further, in one or more embodiments, the adsorbent material 130 in the adsorption vessels 122, and by extension the adsorbent material 130 in the serial adsorption vessels 132 and parallel adsorption vessels 142, may be regenerated to strip the adsorbed organic molecules and reset the equilibrium. Any suitable regeneration method known to those skilled in the art may be implemented in accordance with the present disclosure.

Example methods of desorption and regeneration include one, or more usually a combination, of the following: increase in temperature, reduction in partial pressure, reduction in concentration, purging with an inert fluid, displacement with a more strongly adsorbing species, a polar solvent desorbing the adsorbed species, or a change of chemical conditions such as pH. The method may be selected based on the particular adsorbent material 130 deployed in the adsorption vessels 122. When utilizing a polar solvent to desorb the adsorbed species, such solvent, in one or more embodiments, may have a Hildebrandt solubility parameter of at least 18 MPa.

Treated Plastic Pyrolysis Oil

As previously indicated, it is desirable to remove organic molecules comprising one or more atoms of sulfur, nitrogen, oxygen, or chlorine from the liquid stream of plastic pyrolysis oil 102 before feeding the resulting treated plastic pyrolysis oil stream 108 to conventional refining processes for production of value added products as such organic molecules may impede or affect the chemical reactions occurring in the conventional refining processes.

In one or more embodiments, the treated plastic pyrolysis oil stream 108 may comprise up to 10 ppmw of sulfur. In various further embodiments, the treated plastic pyrolysis oil stream 108 may comprise up to 8 ppmw sulfur, up to 6 ppmw sulfur, up to 3 ppmw sulfur, or up to 1 ppmw sulfur.

In one or more embodiments, the treated plastic pyrolysis oil stream 108 may comprise up to 10 ppmw of nitrogen. In various further embodiments, the treated plastic pyrolysis oil stream 108 may comprise up to 8 ppmw nitrogen, up to 6 ppmw nitrogen, up to 3 ppmw nitrogen, or up to 1 ppmw nitrogen.

In one or more embodiments, the treated plastic pyrolysis oil stream 108 may comprise up to 10 ppmw of chlorine. In various further embodiments, the treated plastic pyrolysis oil stream 108 may comprise up to 8 ppmw chlorine, up to 6 ppmw chlorine, up to 3 ppmw chlorine, or up to 1 ppmw chlorine.

In one or more embodiments, the treated plastic pyrolysis oil stream 108 may comprise up to 10 ppmw of oxygen. In various further embodiments, the treated plastic pyrolysis oil stream 108 may comprise up to 8 ppmw oxygen, up to 6 ppmw oxygen, up to 3 ppmw oxygen, or up to 1 ppmw oxygen.

In one or more embodiments, the process for converting waste plastics to refining feedstock may be integrated with a conventional refinery. For purposes of this disclosure a conventional refinery is meant as to reference an existing refining operation for processing crude oil into a plurality of useful products.

EXAMPLES

The following examples illustrate features of the present disclosure but are not intended to limit the scope of the disclosure.

To demonstrate the utility of the process for converting waste plastics to refining feedstock in accordance with the present disclosure representative testing was completed. Specifically, a plastic pyrolysis oil was generated and then processed to remove organic molecules comprising one or more atoms of sulfur, nitrogen, oxygen, or chlorine as discussed in the present disclosure.

Plastic Pyrolysis Oil Generation

A plastic feed comprising a mixture of HDPE, LDPE, PP, LLDPE, PS, and PET was provided to the plastic pyrolysis unit 110 and processed to generate a stream of plastic pyrolysis oil 102. Further output from the plastic pyrolysis unit 110 were gas products including C1, C2, C3, C4 paraffinic and olefinic hydrocarbons as well as other contaminant gases and various solids. The properties and composition of the plastic pyrolysis oil 102 are shown in Table 2A. Further, the plastic pyrolysis oil 102 is provided to a first fractionator 152 in accordance with the present disclosure and separated into the distillate fraction 103 including naphtha and diesel boiling in the range of 36 to 370° C. and a vacuum gas oil fraction 104 including hydrocarbons boiling at 370° C. or greater. The breakdown of naphtha, diesel, and vacuum gas oil are also provided in Table 2.

TABLE 2

Plastic Pyrolysis Oil Composition

| Property/Composition | Unit | Value |
| --- | --- | --- |
| Density | kg/m³ | 790 |
| Chlorine | Ppmw (parts per million by weight) | 130 |
| Nitrogen | ppmw | 1,139 |
| Sulfur | ppmw | 82 |
| Oxygen | ppmw | 1,562 |
| Metals | ppmw | 65 |
| Di-olefins | W % (weight percent) | 19.6 |
| Mono-Olefins | W % | 9.4 |
| Naphtha (36-180° C.) | W % | 30.6 |
| Diesel (180 370° C.) | W % | 59.0 |
| VGO (370° C.) | W % | 10.4 |

Inventive Example 1

The example plastic pyrolysis oil having the composition outline in Table 2A was processed with an adsorbent material in an adsorption vessel in accordance with the present disclosure. Specifically, 50 grams of the example plastic pyrolysis oil was pass through an adsorption column containing 20 grams of activated carbon at a temperature of 20° C. and atmospheric pressure. The activated carbon utilized had a surface area of 770 m²/g, average pore size of 12.7 Å°, and pore volume of 0.442 cm³/g. The generated treated plastic pyrolysis oil discharged as the effluent from the adsorption column packed with activated carbon was collected and analyzed for the presence of nitrogen, sulfur, and chlorine. It is noted that 48 grams of the treated plastic pyrolysis oil was collected. The reduction in nitrogen, sulfur, and chlorine is shown in Table 3. A simulated distillation profile of the treated plastic pyrolysis oil generated from adsorption over a column of activated carbon was also generated as shown in Table 4.

TABLE 3

Treated Plastic Pyrolysis Oil Composition - Inventive Example 1

| Component | Example Plastic Pyrolysis Oil (Table 2A) | Inventive Example 1 - Treated Plastic Pyrolysis Oil (Activated Carbon) |
| --- | --- | --- |
| Chlorine (ppmw) | 130 | 62 |
| Nitrogen (ppmw) | 600 | 64 |
| Sulfur (ppmw) | 82 | 32 |

TABLE 4

Treated Plastic Pyrolysis Oil Distillation Profile - Inventive Example 1

| Boiling Point Percentile | | Example Plastic Pyrolysis Oil (Table 2) | Inventive Example 1 - Treated Plastic Pyrolysis Oil (Activated Carbon) |
| --- | --- | --- | --- |
| 0 W % (initial boiling point) | ° C. | 32 | 35 |
| 5 W % | ° C. | 66 | 73 |
| 10 W % | ° C. | 96 | 99 |
| 20 W % | ° C. | 132 | 136 |
| 30 W % | ° C. | 149 | 159 |
| 40 W % | ° C. | 193 | 196 |
| 50 W % | ° C. | 233 | 236 |
| 60 W % | ° C. | 267 | 270 |
| 70 W % | ° C. | 298 | 301 |
| 80 W % | ° C. | 326 | 329 |
| 90 W % | ° C. | 355 | 358 |
| 95 W % | ° C. | 378 | 381 |
| 100 W % (final boiling point) | ° C. | 428 | 438 |

A review of Table 3 reveals that the treatment of the example plastic pyrolysis oil with the activated carbon in accordance with the processes of the present disclosure resulted in a reduction in nitrogen, sulfur, and chlorine in the treated plastic pyrolysis oil. Specifically, the treated plastic pyrolysis oil of Inventive Example 1 exhibited an 89 percent reduction in nitrogen, a 61 percent reduction in sulfur, and a 52.3 reduction on chlorine. Further, it is noted with reference to Table 4, that there was no significant change in the boiling point characteristics of the treated plastic pyrolysis oil of Inventive Example 1 compared to the initial example plastic pyrolysis oil.

Inventive Example 2

The example plastic pyrolysis oil having the composition outline in Table 2A was also processed with a USY zeolite serving as the adsorbent material in an adsorption vessel in accordance with the present disclosure. Specifically, 50 grams of the example plastic pyrolysis oil was pass through an adsorption column containing 20 grams of USY zeolite at a temperature of 20° C. and atmospheric pressure. A zeolite based adsorbent was used. The adsorbent contained 35 W % of USY zeolite with the remainder an alumina binder. The USY zeolite had a surface area of 280 m²/g and a pore volume of 0.19 cm³/g. The generated treated plastic pyrolysis oil discharged as the effluent from the adsorption column packed with USY zeolite was collected and analyzed for the presence of nitrogen, sulfur, and chlorine. It is noted that 47 grams of the treated plastic pyrolysis oil was collected. The reduction in nitrogen, sulfur, and chlorine is shown in Table 5. A simulated distillation profile of the treated plastic pyrolysis oil generated from adsorption over a column of USY zeolite was also generated as shown in Table 6.

TABLE 5

Treated Plastic Pyrolysis Oil Nitrogen Composition - Inventive Example 2

| Component | Example Plastic Pyrolysis Oil (Table 2A) | Inventive Example 2 - Treated Plastic Pyrolysis Oil (USY Zeolite) |
| --- | --- | --- |
| Nitrogen (ppmw) | 600 | 77 |

TABLE 6

Treated Plastic Pyrolysis Oil Distillation Profile - Inventive Example 2

| Boiling Point Percentile | | Example Plastic Pyrolysis Oil (Table 2A) | Inventive Example 2 - Treated Plastic Pyrolysis Oil (USY Zeolite) |
| --- | --- | --- | --- |
| 0 W % (initial boiling point) | ° C. | 32 | 37 |
| 5 W % | ° C. | 66 | 93 |
| 10 W % | ° C. | 96 | 116 |
| 20 W % | ° C. | 132 | 138 |
| 30 W % | ° C. | 149 | 172 |
| 40 W % | ° C. | 193 | 213 |
| 50 W % | ° C. | 233 | 245 |
| 60 W % | ° C. | 267 | 276 |
| 70 W % | ° C. | 298 | 303 |
| 80 W % | ° C. | 326 | 331 |
| 90 W % | ° C. | 355 | 364 |
| 95 W % | ° C. | 378 | 386 |
| 100 W % (final boiling point) | ° C. | 428 | 441 |

A review of Table 5 reveals that the treatment of the example plastic pyrolysis oil with the USY zeolite in accordance with the processes of the present disclosure resulted in a reduction in nitrogen in the treated plastic pyrolysis oil. Specifically, the treated plastic pyrolysis oil of Inventive Example 2 exhibited an 87 percent reduction in nitrogen. Further, it is noted with reference to Table 6, that there was no significant change in the boiling point characteristics of the treated plastic pyrolysis oil of Inventive Example 2 compared to the initial example plastic pyrolysis oil.

It should now be understood the various aspects of the process for converting waste plastics to refining feedstock and associated system are described and such aspects may be utilized in conjunction with various other aspects.

According to a first aspect, a process for converting waste plastics to refining feedstock includes (a) conducting pyrolysis of a plastic feedstock comprising waste plastics to produce a liquid stream of plastic pyrolysis oil, an off-gas stream, and a solids stream; (b) directly feeding the liquid stream of plastic pyrolysis oil to an adsorption based purification process to generate a treated plastic pyrolysis oil stream comprising less than 10 ppmw nitrogen, less than 10 ppmw sulfur, less than 10 ppmw chlorine, and less than 10 ppmw oxygen, the adsorption based purification process comprising: i) contacting the liquid stream of plastic pyrolysis oil with one or more adsorbent materials in an adsorption vessel, the adsorbent materials configured for adsorption of organic molecules comprising one or more atoms of sulfur, nitrogen, oxygen, or chlorine, wherein at least one of the one or more adsorbent materials are configured for adsorption of organic molecules comprising each of sulfur, nitrogen, oxygen, and chlorine; and ii) discharging the treated plastic pyrolysis oil stream from the adsorption vessel; and (c) collecting the treated plastic pyrolysis oil stream from the adsorption vessel for further processing into value added products as a feedstock for conventional refining processes A second aspect includes the process of the first aspect, in which the pyrolysis of a plastic feedstock is performed in the presence of a catalyst at a temperature of 300° C. to 1000° C.

A third aspect includes the process of the first or second aspect, in which the plastic feedstock comprises one or more polymers selected from polyethylene terephthalate (PET), High-density polyethylene (HDPE), polyvinyl chloride (PVC), polypropylene (PP), polystyrene (PS), and low-density polyethylene (LDPE).

A fourth aspect includes the process of any of the first through third aspects, in which the plastic feedstock comprises mixed plastics of differing compositions.

A fifth aspect includes the process of any of the first through fourth aspects, in which the adsorbent material is selected from the group consisting of natural clays, alumina, silica gel, activated carbon, natural zeolites, synthetic zeolites, alumina, silica, or a combination of alumina and silica in an amorphous or crystalline state.

A sixth aspect includes the process of any of the first through fourth aspects, in which the adsorbent material comprises activated carbon.

A seventh aspect includes the process of any of the first through sixth aspects, in which the adsorption vessel comprises a fixed-bed of the adsorbent material.

An eighth aspect includes the process of any of the first through sixth aspects, in which the adsorption vessel comprises a slurry-bed of the adsorbent material.

A ninth aspect includes the process of any of the first through sixth aspects, in which the adsorption vessel comprises a moving-bed of the adsorbent material.

A tenth aspect includes the process of any of the first through ninth aspects, in which the adsorbent material is provided as a pellet, sphere, extrudate, or natural shape having a size in the range of 4 mesh to 60 mesh.

An eleventh aspect includes the process of any of the first through tenth aspects, in which the adsorption based purification process comprises two or more adsorption vessels.

A twelfth aspect includes the process of the eleventh aspect, in which the adsorption vessels are provided in series.

A thirteenth aspect includes the process of the eleventh aspect, in which the adsorption vessels are provided in parallel.

A fourteenth aspect includes the process of the thirteenth aspect, in which the adsorption vessels are operated in an alternating manner such that at least one adsorption vessel is undergoing regeneration while at least one different adsorption vessel is operating for adsorption of the organic molecules comprising one or more atoms of sulfur, nitrogen, oxygen, or chlorine from the liquid stream of plastic pyrolysis oil.

A fifteenth aspect includes the process of the eleventh aspect, in which the adsorption vessels are provided as parallel adsorption pathways of adsorption vessels are provided in series.

A sixteenth aspect includes the process of the fifteenth aspect, in which the parallel adsorption pathways are operated in an alternating manner such that at least one of the parallel adsorption pathways is undergoing regeneration while at least one different parallel adsorption pathways is operating for adsorption of the organic molecules comprising one or more atoms of sulfur, nitrogen, oxygen, or chlorine from the liquid stream of plastic pyrolysis oil.

A seventeenth aspect includes the process of any of the eleventh through sixteenth aspects, in which the same adsorbent material is disposed in each of the adsorption vessels.

An eighteenth aspect includes the process of any of the eleventh through sixteenth aspects, in which at least two of the adsorption vessels comprise differing compositions of the adsorbent material.

A nineteenth aspect includes the process of any of the first through eighteenth aspects, in which the adsorbent material comprises a surface area of at least 100 m$^2$/g, an average pore size of at least 10 Å, and a total pore volume of at least 0.1 cm$^3$/g.

A twentieth aspect includes the process of any of the first through nineteenth aspects, in which the liquid stream of plastic pyrolysis oil is contacted with the one or more adsorbent materials in the adsorption vessel at a temperature of 20 to 80° C., a pressure of 1 to 10 bars, and at a liquid hourly space velocity of 0.1 to 1 hours$^{-1}$.

A twenty-first aspect includes the process of any of the first through twentieth aspects, in which the liquid stream of plastic pyrolysis oil comprises up to 2000 ppmw sulfur, up to 5000 ppmw nitrogen, up to 2000 ppmw chlorine, and up to 2000 ppmw oxygen.

A twenty-second aspect includes the process of any of the first through twenty-first aspects, in which the treated plastic pyrolysis oil stream comprises less than 1 ppmw nitrogen, less than 1 ppmw sulfur, less than 1 ppmw chlorine, and less than 1 ppmw oxygen.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned. For brevity, the same is not explicitly indicated subsequent to each disclosed range and the present general indication is provided.

As used in this disclosure and in the appended claims, the words "comprise," "has," and "include" and all grammatical variations thereof are each intended to have an open, non-limiting meaning that does not exclude additional elements or steps.

What is claimed is:

1. A process for converting waste plastics to refining feedstock comprising:
    (a) conducting pyrolysis of a plastic feedstock comprising waste plastics to produce a liquid stream of plastic pyrolysis oil, an off-gas stream, and a solids stream;
    (b) directly feeding the liquid stream of plastic pyrolysis oil to an adsorption based purification process comprising treatment of the liquid stream of plastic pyrolysis oil in three or more adsorption vessels to generate a treated plastic pyrolysis oil stream comprising less than 10 ppmw nitrogen, less than 10 ppmw sulfur, less than 10 ppmw chlorine, and less than 10 ppmw oxygen, the adsorption based purification process comprising:
        i) contacting the liquid stream of plastic pyrolysis oil with one or more adsorbent materials in each of the three or more adsorption vessels, the adsorbent materials configured for adsorption of organic molecules comprising one or more atoms of sulfur, nitrogen, oxygen, or chlorine, wherein:
            the liquid stream of plastic pyrolysis oil is contacted with the one or more adsorbent materials in the three or more adsorption vessels at a temperature of 20 to 80° C., a pressure of 1 to 10 bars, and at a liquid hourly space velocity of 0.1 to 1 hours$^{-1}$;
            at least one of the one or more adsorbent materials are configured for adsorption of organic molecules comprising each of sulfur, nitrogen, oxygen, and chlorine, and
            at least two of the three or more adsorption vessels comprise differing compositions of the adsorbent material; and
        ii) discharging the treated plastic pyrolysis oil stream from the three or more adsorption vessels; and
    (c) collecting the treated plastic pyrolysis oil stream from the three or more adsorption vessels for further processing into value added products as a feedstock for conventional refining processes.

2. The process of claim 1, where the pyrolysis of the plastic feedstock is performed in the presence of a catalyst at a temperature of 300° C. to 1000° C.

3. The process of claim 1, where the plastic feedstock comprises one or more polymers selected from polyethylene terephthalate (PET), High-density polyethylene (HDPE), polyvinyl chloride (PVC), polypropylene (PP), polystyrene (PS), and low-density polyethylene (LDPE).

4. The process of claim 3, where the plastic feedstock comprises mixed plastics of differing compositions.

5. The process of claim 1, where the adsorbent material is selected from the group consisting of natural clays, alumina, silica gel, activated carbon, natural zeolites, synthetic zeolites, silica, or a combination of alumina and silica in an amorphous or crystalline state.

6. The process of claim 1, where the adsorbent material comprises activated carbon.

7. The process of claim 1, where at least one of the three or more adsorption vessels comprises a fixed-bed of the adsorbent material.

8. The process of claim 1, where at least one of the three or more adsorption vessels comprises a slurry-bed of the adsorbent material.

9. The process of claim 1, where at least one of the three or more adsorption vessels comprises a moving-bed of the adsorbent material.

10. The process of claim 1, where the adsorbent material is provided as a pellet, sphere, extrudate, or natural shape having a size in the range of 4 mesh to 60 mesh.

11. The process of claim 1, where at least two of the three or more adsorption vessels are provided in series.

12. The process of claim 1, where at least two of the three or more adsorption vessels are provided in parallel.

13. The process of claim 12, where the adsorption vessels provided in parallel are operated in an alternating manner such that at least one adsorption vessel is undergoing regeneration while at least one different adsorption vessel is operating for adsorption of the organic molecules comprising one or more atoms of sulfur, nitrogen, oxygen, or chlorine from the liquid stream of plastic pyrolysis oil.

14. The process of claim 1, where the adsorbent material comprises a surface area of at least 100 m$^2$/g, an average pore size of at least 10 Å, and a total pore volume of at least 0.1 cm$^3$/g.

15. The process of claim 1, where the liquid stream of plastic pyrolysis oil comprises up to 2000 ppmw sulfur, up to 5000 ppmw nitrogen, up to 2000 ppmw chlorine, and up to 2000 ppmw oxygen.

16. The process of claim 1, where the treated plastic pyrolysis oil stream comprises less than 1 ppmw nitrogen, less than 1 ppmw sulfur, less than 1 ppmw chlorine, and less than 1 ppmw oxygen.

\* \* \* \* \*